US008072730B2

(12) United States Patent
Yu et al.

(10) Patent No.: US 8,072,730 B2
(45) Date of Patent: Dec. 6, 2011

(54) CHIP-TYPE PROTECTION DEVICE HAVING ENCLOSED MICRO-GAP BETWEEN ELECTRODES

(75) Inventors: Ho-Chieh Yu, Tao-Yuan Hsien (TW); Chun-You Lin, Tao-Yuan Hsien (TW); Hung-Yi Chuang, Tao-Yuan Hsien (TW)

(73) Assignee: TA-I Technology Co., Ltd., Lujhu Township (TW)

( * ) Notice: Subject to any disclaimer, the term of this patent is extended or adjusted under 35 U.S.C. 154(b) by 155 days.

(21) Appl. No.: 12/507,779

(22) Filed: Jul. 22, 2009

(65) Prior Publication Data

US 2010/0020458 A1 Jan. 28, 2010

(30) Foreign Application Priority Data

Jul. 23, 2008 (TW) ............................... 97213079 U

(51) Int. Cl.
*H02H 9/00* (2006.01)

(52) U.S. Cl. ......................................... 361/212; 361/56

(58) Field of Classification Search .................... 361/56, 361/111, 212
See application file for complete search history.

(56) References Cited

U.S. PATENT DOCUMENTS

| | | | | |
|---|---|---|---|---|
| 2002/0167773 | A1* | 11/2002 | Sawada et al. | 361/112 |
| 2008/0239610 | A1* | 10/2008 | Yu et al. | 361/120 |
| 2010/0067163 | A1* | 3/2010 | Nozoe et al. | 361/220 |

* cited by examiner

*Primary Examiner* — Danny Nguyen

(57) ABSTRACT

The present invention relates to a chip-type protection device having an enclosed micro-gap between electrodes. The invention includes a substrate on which a pair of discharge electrodes extend towards each other by a micro-gap. A wall is disposed in a manner spaced apart from the micro-gaps by a predetermined distance, on which a cover portion is mounted in a straddling manner across the micro-gaps. The wall and the cover portion are integrated under a predetermined gaseous environment to form a hermectic chamber on which an outer protective layer is coated. End electrodes are subsequently formed on the substrate in a manner connected to conductive portions of the discharge electrodes. The invention provides a protection device against over-voltage.

10 Claims, 16 Drawing Sheets

CHIP-TYPE PROTECTION DEVICE HAVING ENCLOSED MICRO-GAP BETWEEN ELECTRODES

FIELD OF THE INVENTION

The present invention relates to a chip-type protection device, and more particularly, to a chip-type protection device having an enclosed micro-gap between electrodes.

DESCRIPTION OF THE RELATED ART

Following the trend of miniaturization of electronic products, chip-type protection devices have been widely adopted in various electronic products, as a means to prevent damages caused by an unexpected over-voltage and electro-static discharge (ESD). As shown in FIG. 1, R.O.C. Patent No. I253881, entitled "Chip-Type Micro Air-Gap Discharge Protection Device and Manufacturing Method Thereof," describes a ceramic substrate 11, on the top of which a plurality of layers are formed, including, in the order from the substrate side, two end electrodes 14, a first buffer layer 17 disposed between the end electrodes, an electrode layer made of a conductive material having a Pd or Pt content of higher than 10% and mounted on the first buffer layer 17 in a manner connected to the end electrodes 14, and a second buffer layer 18. A gap 16 is subsequently formed by making a central cut on the second buffer layer 18 with a depth down to the first buffer layer 17 using a laser or a diamond blade, such that the electrode layer is divided into two separated discharge electrodes 12 as illustrated. The gap 16 is filled with a volatile material that can be readily evaporated by heat.

Next, as shown in FIG. 2, the main structural region at both edges of the protection device 1, except for the electrode areas, is covered with an outer protective layer 15. The volatile material is then made evaporated to a gas by applying heat to the entire substrate 11, such that a chamber 134 filled with the volatized gas is formed between the paired discharge electrodes and covered by the outer protective layer 15. A solder interfacial layer is finally plated onto both edges of the ceramic substrate 11 in a manner connected to the end electrodes 14.

Due to the limitation of using a laser beam or a diamond blade in formation of the gap, the gap width between the paired discharge electrodes in the conventional protection device 1 cannot be reduced beyond a minimum of about 10-30 μm. The relatively wide gap width may make the protection device 1 to be electrically conductive only when the electrostatic voltage applied exceeds a relatively high value, risking the safety of other circuit elements. Moreover, since the outer protective layer 15 is formed by sintering at high temperature, the fabrication materials and manufacture facilities for producing the protection device 1 should be resistant to heat, resulting in a high manufacture cost and a relatively complicated manufacturing process. In particular, the evaporated volatile material filled within the chamber 134 has to be inert to the electrodes and this requirement severely limits the range of suitable materials.

Therefore, there exists a need for a protection device for providing protection to electronic devices exposed to over-voltage or ESD, which is subjected to photolithography to accomplish a relatively narrow gap width between discharge electrodes and includes a chamber filled with a predetermined gas. The present invention provides the best solution in response to the need.

SUMMARY OF THE INVENTION

Accordingly, an object of the present invention is to provide a chip-type protection device having an enclosed micro-gap between electrodes, which can be easily fabricated without subjected to heat treatment at high temperature for the sole purposes of evaporating the material within the micro-gap and sintering the outer protective layer.

Another object of the invention is to provide a chip-type protection device having an enclosed micro-gap between electrodes, in which the micro-gap is optionally under vacuum, or filled with air or an inert gas, so as to protect the electrodes from damages.

It is still another object of the invention to provide a chip-type protection device having an enclosed micro-gap between electrodes, in which the internal environment of the micro-gap is so effectively controlled as to prolong the product life.

A yet another object of the invention to provide a chip-type protection device having an enclosed micro-gap between electrodes, which is driven to discharge by a lower initial discharge voltage and, therefore, provides a higher degree of safety against ESD.

The present invention therefore provides a chip-type protection device having an enclosed micro-gap between electrodes. The chip-type protection device comprises a substrate having two opposite surfaces made of poor conductor; plural sets of paired discharge electrodes, arranged in parallel to one another on either of the two opposite surfaces, wherein each set of the plural sets of paired discharge electrodes includes a pair of conductive portions connected to opposite edges of the substrate respectively and a pair of discharge portions extending from the respective conductive portions towards each other by a micro-gap; and a surrounding wall hermetically enclosing, together with the substrate, the micro-gaps to constitute a chamber having a predetermined gaseous environment. The surrounding wall comprises an elevated portion formed on the plural sets of paired discharge electrodes in a manner spaced apart from the micro-gaps by a predetermined distance; and at least one cover portion disposed above the elevated portion in a straddling manner across the micro-gaps.

The chip-type protection device according to the invention includes an enclosed hollow chamber formed under a selected gaseous environment to encapsulate a predetermined gas. As a result, the chamber provides a desired environment for accommodating the discharge electrodes, so as to facilitate a discharge operation and protect the discharge electrodes from side effects caused by contamination in the gas, thereby prolonging the product life. In particular, the invention has advantages of being fabricated at low manufacture cost by a relatively simple process without subjected to heat treatment at high temperature, thereby achieving an improved production yield. The invention is adapted for being fabricated by manufacturing processes with higher precision and the resulting protection device has an improved sensitivity and undergoes discharging at a lower initial voltage, therefore, provides a higher degree of circuit safety under the impact of electrostatic voltage.

BRIEF DESCRIPTION OF THE DRAWINGS

The above and other objects, features and effects of the invention will become apparent with reference to the following description of the preferred embodiments taken in conjunction with the accompanying drawings, in which.

DETAILED DESCRIPTION OF THE INVENTION

Figure 1:
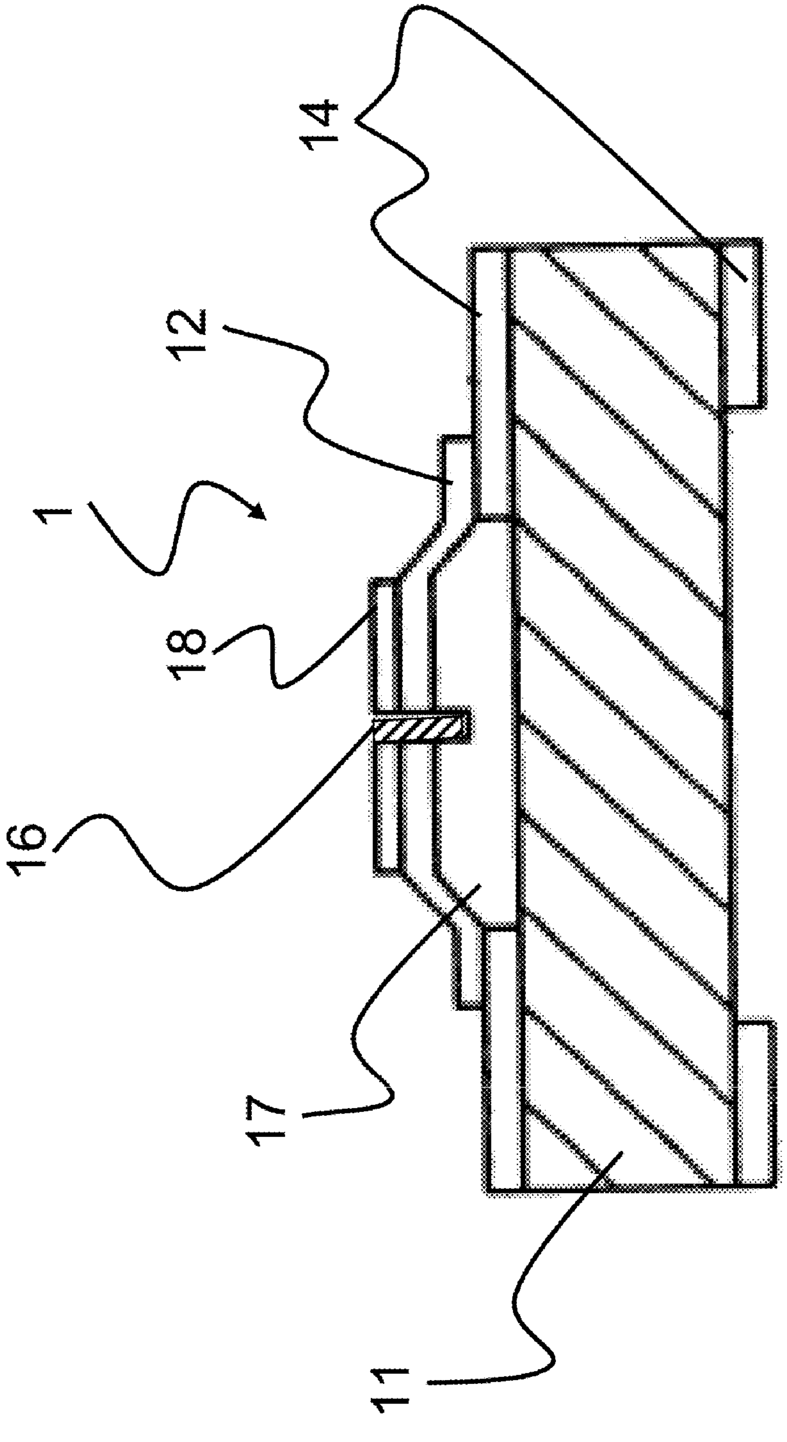
PRIOR ART FIG. 1
FIG. 1 is a schematic diagram of a conventional protection device under processing, showing that a volatile material is filled into a micro-gap between electrodes.
Figure 2:
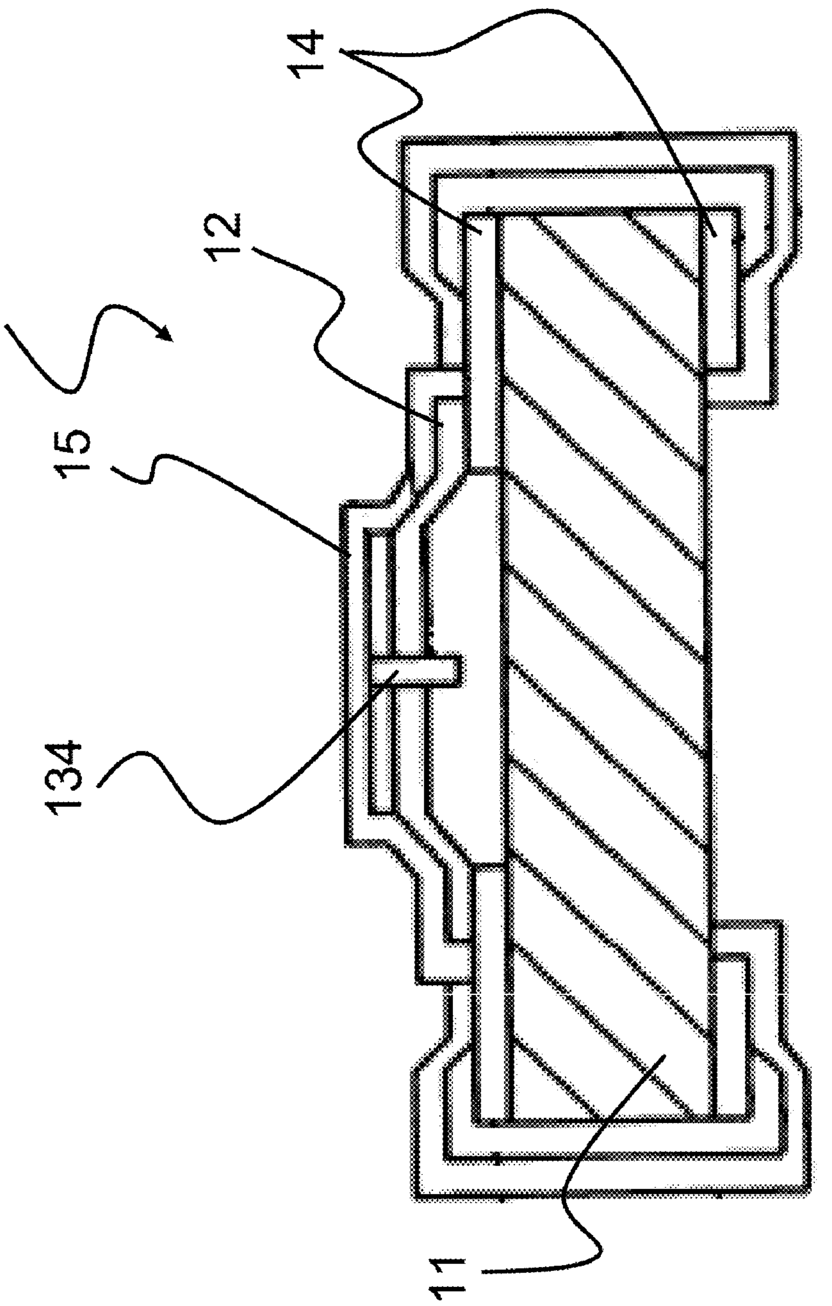
PRIOR ART FIG. 2
FIG. 2 is a schematic cross-section view of a conventional protection device.
Figure 3:
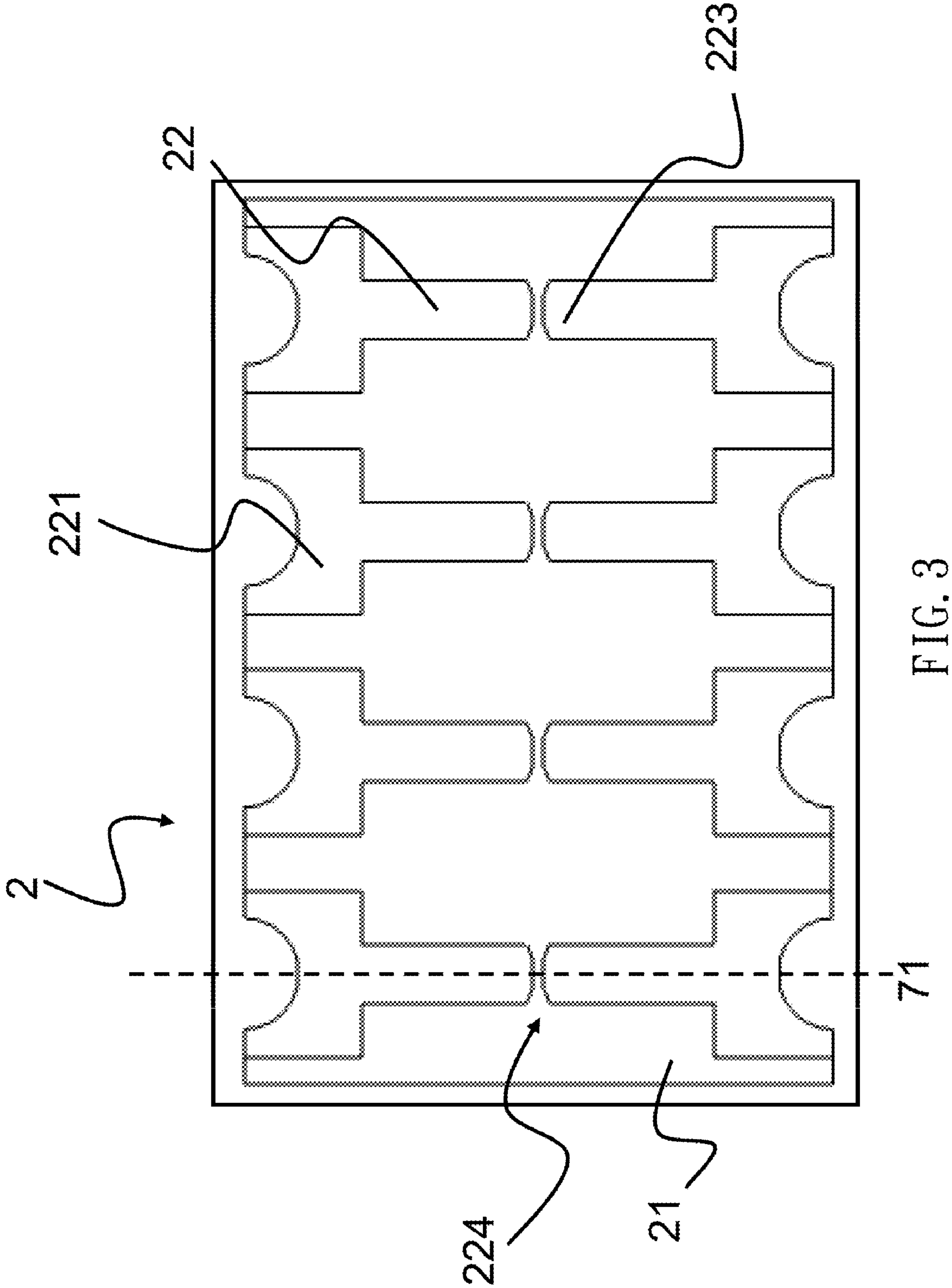
FIGS. 3 and 4 are schematic top and cross-section views of the first embodiment of the invention under processing, showing a substrate on which paired discharge electrodes are formed and spaced apart by a micro-gap.
Figure 4:
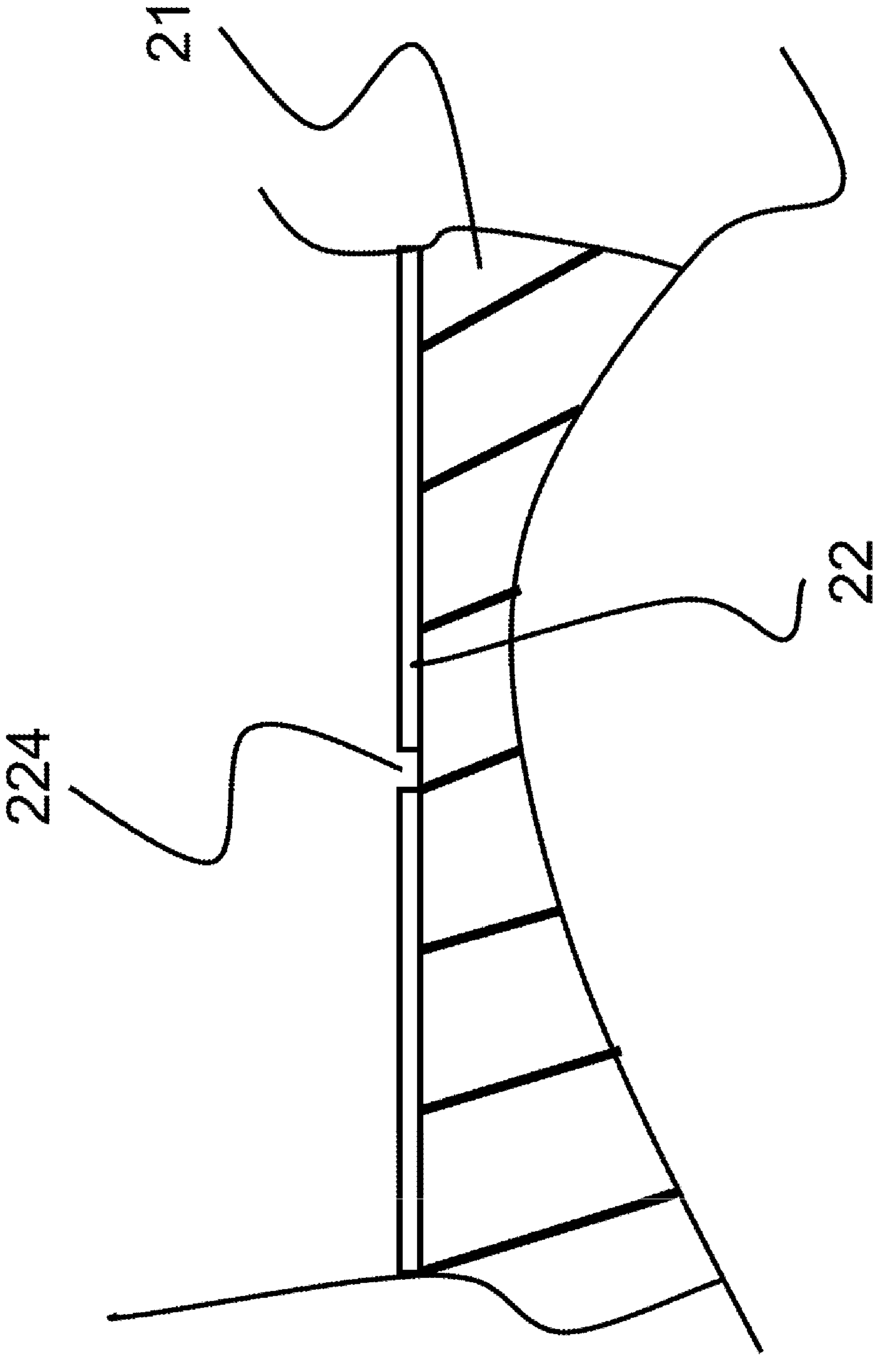

Referring to FIG. 3 and a cross-section view thereof along a line 71 as shown in FIG. 4, the chip-type protection device 2 according to the first embodiment of the invention includes a substrate 21, wherein at least the uppermost and bottommost sides of the substrate 21 are made of poor conductor, so as to avoid any interference with the operation of the protection device. In this embodiment, the substrate 21 is described by way of example to be a substrate of aluminum oxide. However, one having ordinary skill in the art will appreciate that ceramic substrates and even metal substrates coated with insulation material also fall within the scope of the invention. The substrate 21 has plural pairs, for example four pairs, of separated discharge electrodes 22. For illustrative purpose, the part of an individual discharge electrode 22 connected to a corresponding edge of the substrate 21 is defined to be a conductive portion 221, from which a discharge portion 223 extends towards the other electrode in the same pair of discharge electrodes.

By virtue of photolithography technology and electroplating process for fabricating metal electrodes, one discharge portion 223 in a given pair of discharge electrodes may be spaced apart from the other discharge portion in said pair by a micro-gap 224 of down to about 0.5-10 μm. In this embodiment, the discharge portion 223 has an arc-shaped free end, so as to protect the free end from damages during a discharging event. The width of the micro-gap 224 is known to be a determinant factor for the magnitude of the initial discharge voltage. A narrower width of the micro-gap 224 allows the protection device to discharge at a lower electrostatic voltage and, therefore, provides a higher degree of circuit safety under the impact of high electrostatic voltage. However, as the conventional process described above involves filling the micro-gap with volatile material, a narrower width of the micro-gap 224 also means extra difficulty in ensuring that the micro-gap is filled up with the volatile material. This significantly limits application of the manufacturing processes with higher precision to fabricate protection devices.

Figure 5:
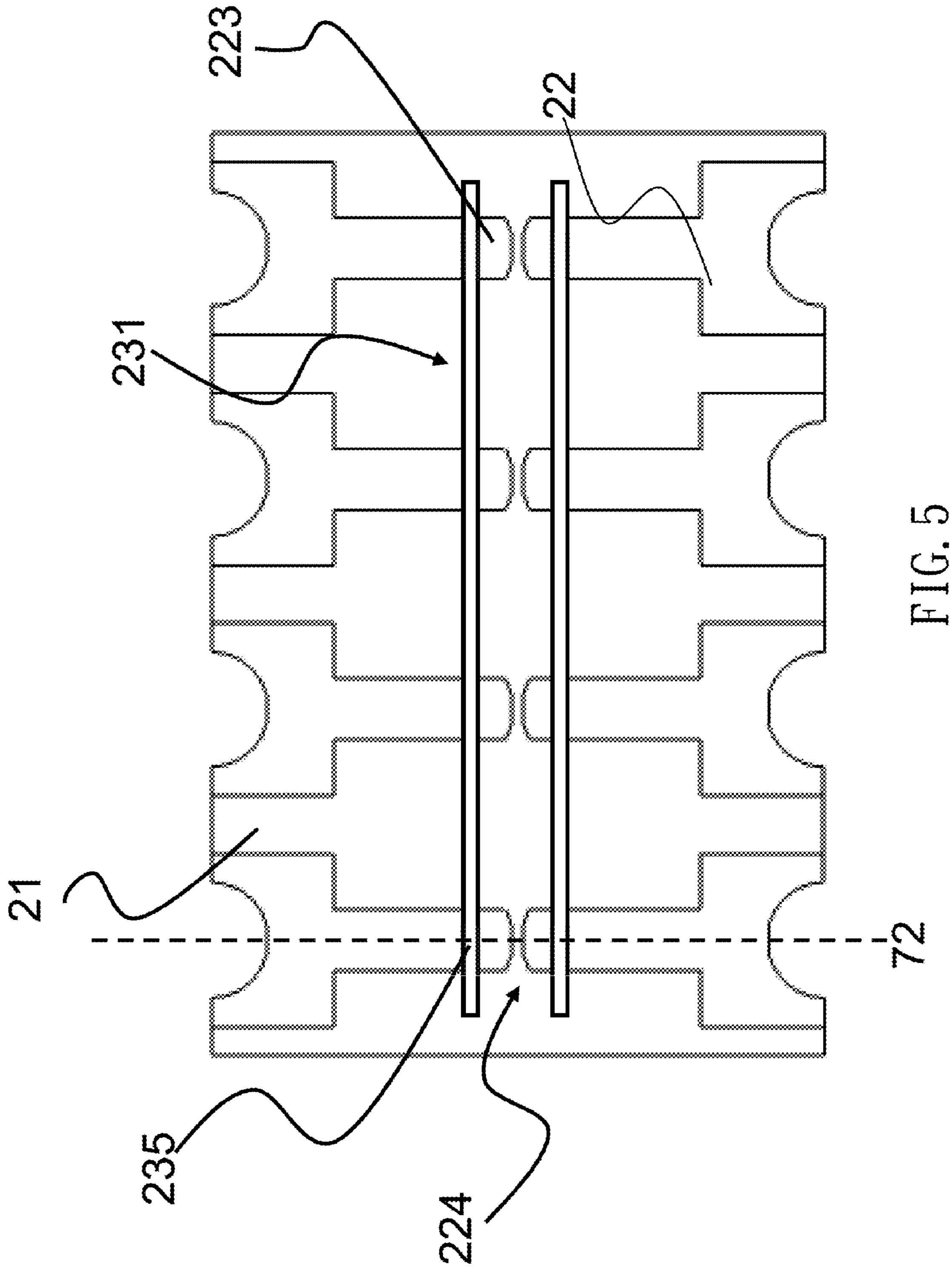
FIGS. 5 and 6 are another schematic top and cross-section views of the first embodiment of the invention, showing that two frames are formed on the discharge electrodes to constitute an elevated portion.
Figure 6:
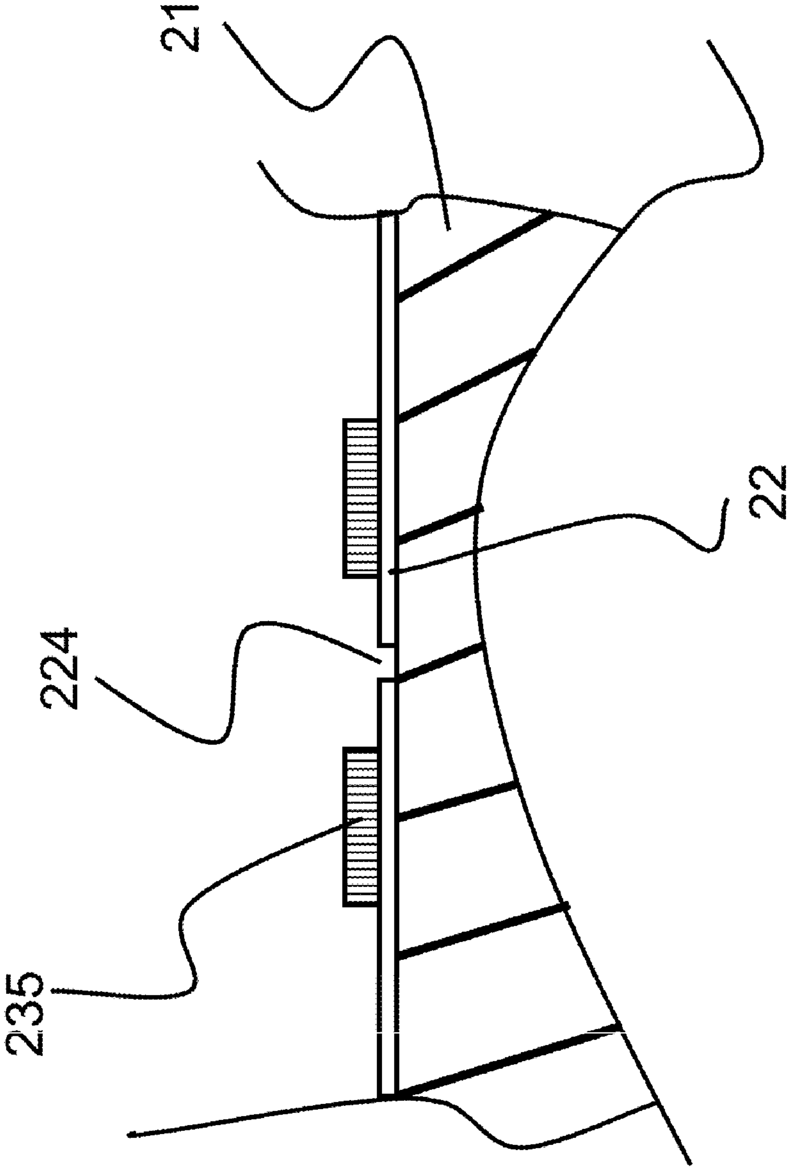
Figure 7:
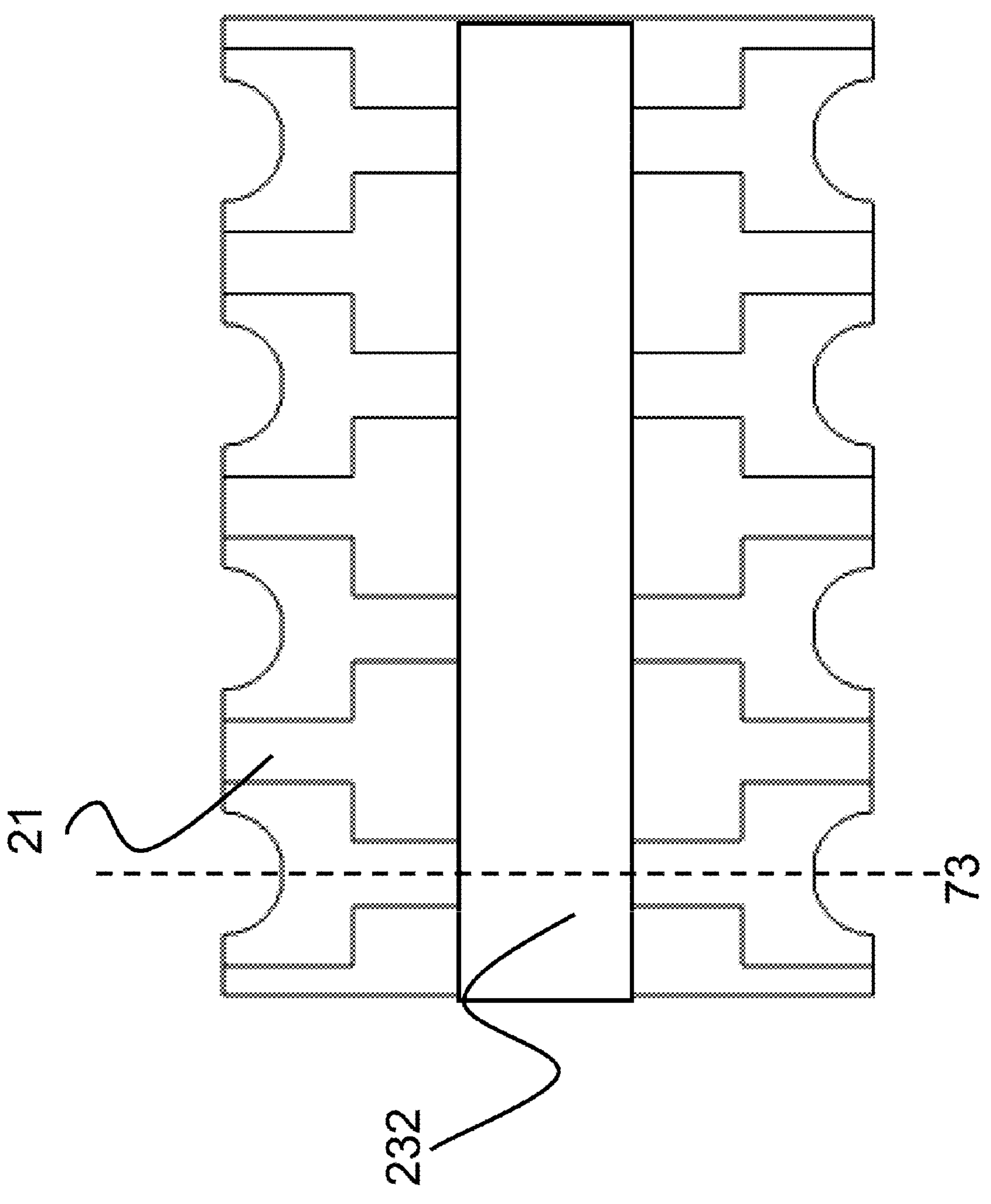
FIGS. 7 and 8 are yet another schematic top and cross-section views of the first embodiment of the invention, showing that a cover portion is disposed above the elevated portion in a straddling manner across the micro-gap.
Figure 8:
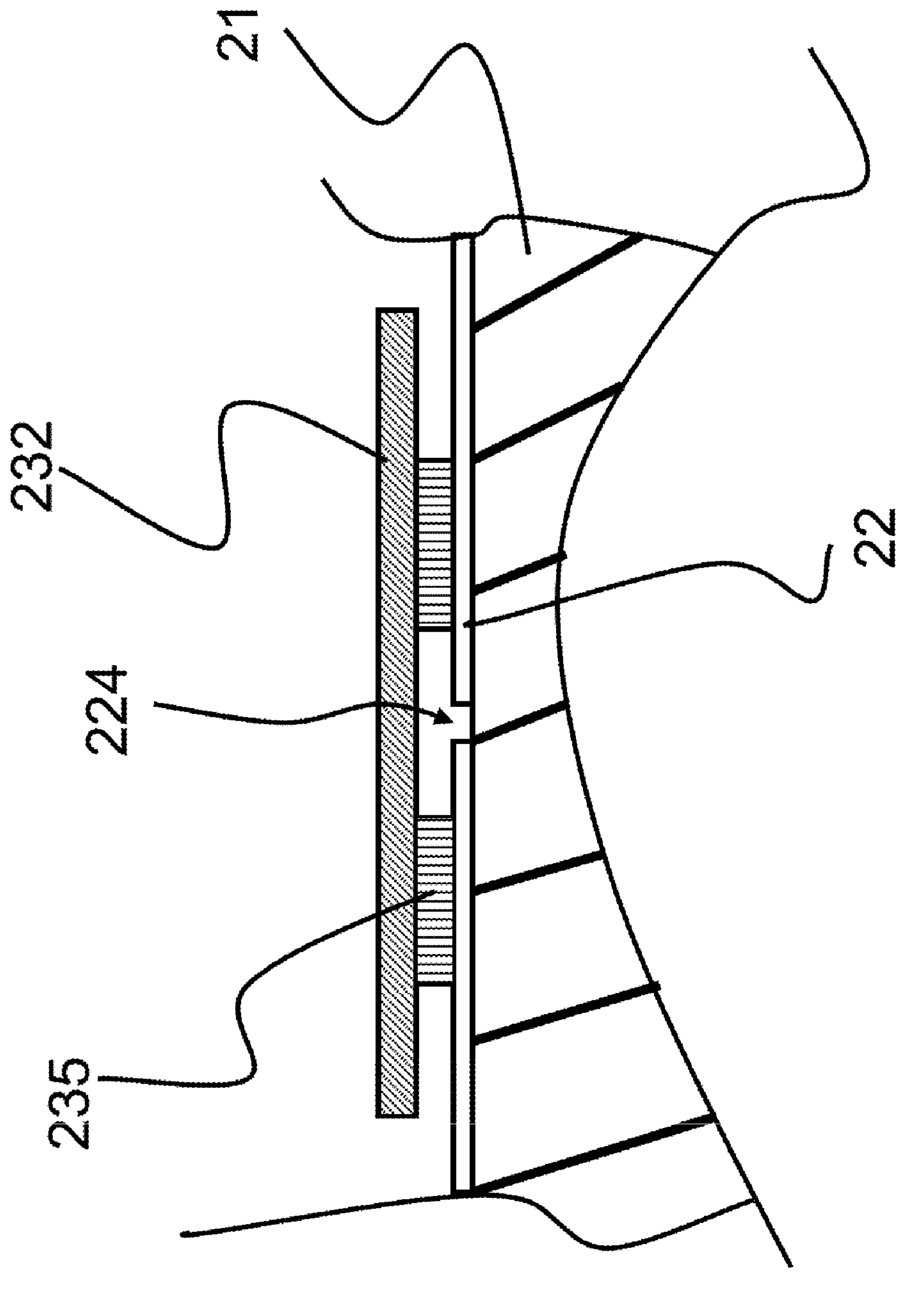

According to the embodiment shown in FIG. 5 and a cross-section view thereof along a line 72 as shown in FIG. 6, frames 235 are deposited on the discharge portions 223 of the four pairs of electrodes 22 along both sides of the micro-gaps 224 by press printing a layer of dry film photoresist composition curable at low temperature. For illustrative purpose, the frames 235 are generally described as an elevated portion 231. Now referring to FIG. 7 and a cross-section view thereof along a line 73 as shown in FIG. 8, the elevated portion 231 is additionally covered with a cover portion 232, which is a layer of cured dry film photoresist straddling across the micro-gaps 224, such that the elevated portion 231, together with the cover portion 232 and substrate 21, enclose the micro-gaps 224 of the four paired electrodes to define a chamber.

At this moment, all of the fabricating steps were carried out under vacuum to ensure that the resultant chamber provides a low pressure or nearly vacuum environment. The cover portion 232 and elevated portion 231 are made of the same material that is curable at a temperature as low as around 100 or so. The elevated portion 231 provides firm support to the cover portion 232 to effectively prevent the cover portion 232 from sagging down into the micro-gaps 224, while maintaining the nearly vacuum environment within the micro-gaps. As a result, it ensures that the electrical characteristics of the discharge electrodes 22 perform perfectly as expected.

Figure 9:
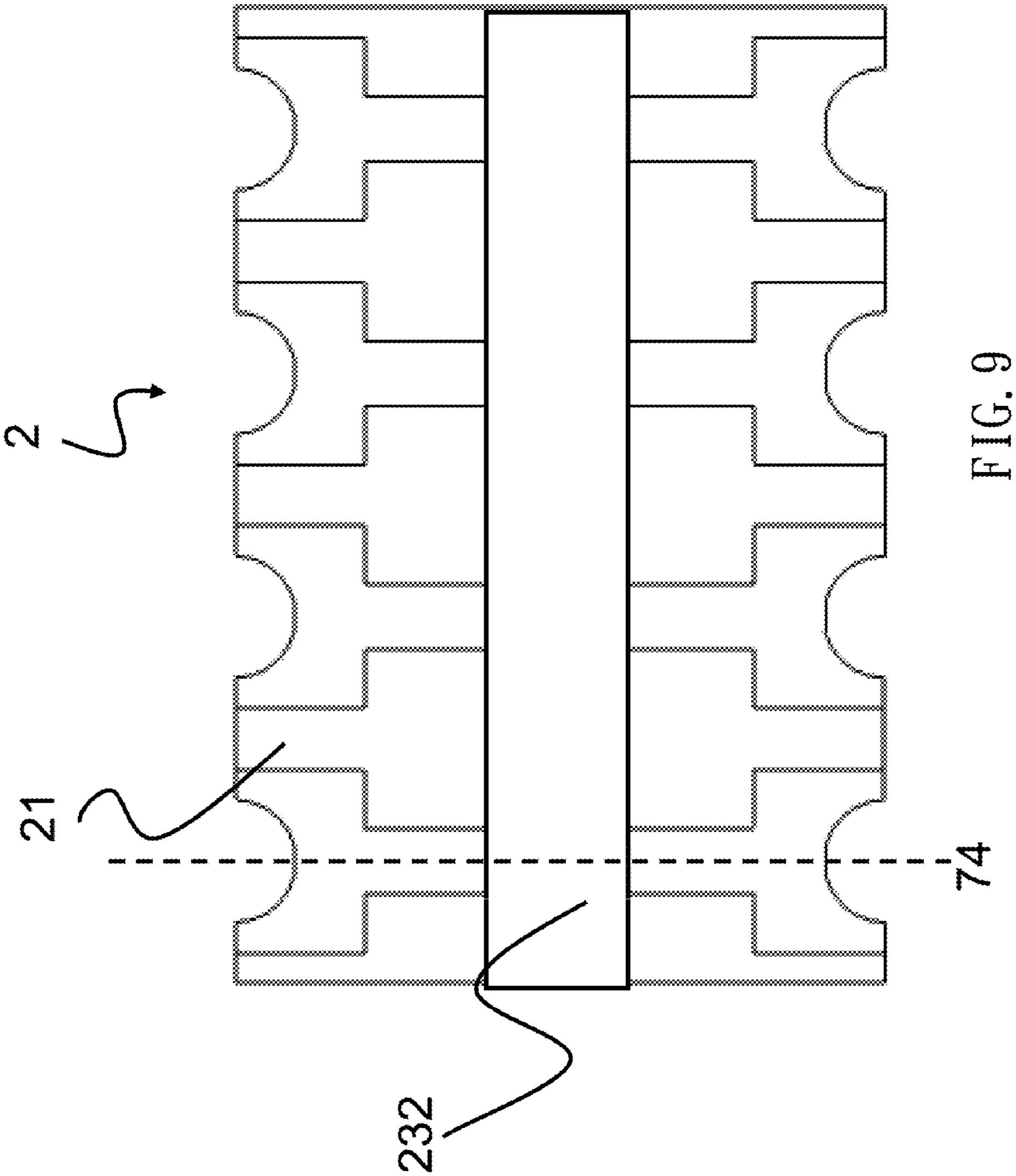
FIGS. 9 and 10 are yet another schematic top and cross-section views of the first embodiment of the invention, showing that the elevated portion and the cover portion are treated to form an enclosed chamber with the electrode micro-gap.
Figure 10:
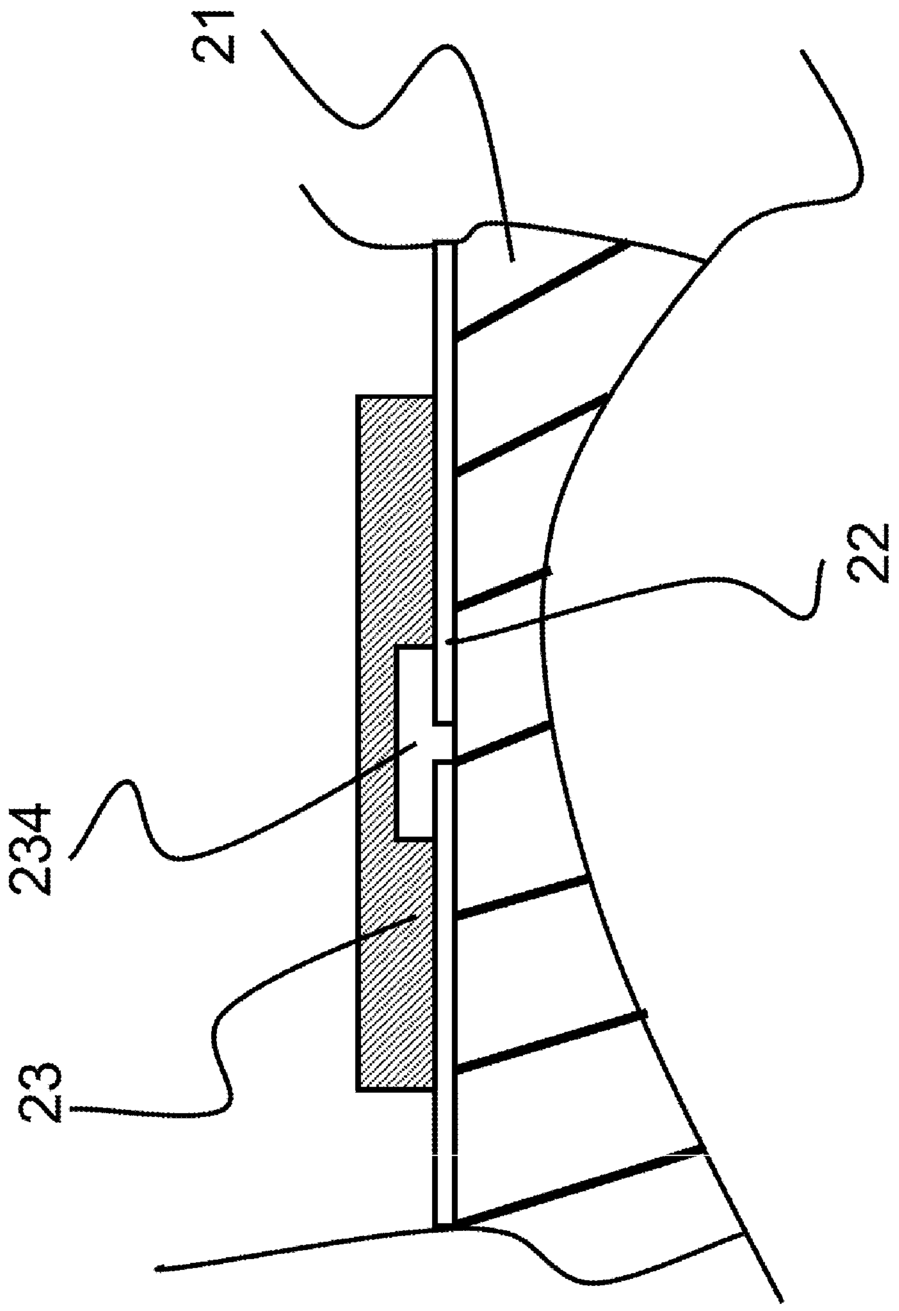

Of course, it would be appreciated by those skilled in the art that the embodiment described above, in which the chamber is formed under an extremely low pressure environment, is provided for illustrative purpose only and is not intended to limit the scope of the invention. The invention also contemplates carrying out the processing steps described above in a predetermined gaseous environment, which could be a vacuum condition, or an environment wholly filled up with dry air or an inert gas. The substrate 21 is then heated in the predetermined gaseous environment. As shown in FIG. 9 and a cross-section view thereof along a line 74 as shown in FIG. 10, the elevated portion 231 described above is melted integrally with the cover portion 232 to form a surrounding wall 23 connected to the substrate 21. As a result, the chamber 234 provides a desired environment for accommodating the free ends or discharge ends of the discharge electrodes 22, so as to protect the discharge ends from contamination and oxidation. This configuration has advantages of being fabricated by a relatively simple process, maintaining the electrical characteristics of electrodes, having an improved production yield and having prolonged product life.

It is noteworthy that, for the purpose of large-scale production, the substrate 21 processed according to the above mentioned procedure may still be in the form of an uncut substrate, on which hundreds or thousands of protection devices are fabricated in batch mode with the same processing steps.

Figure 11:
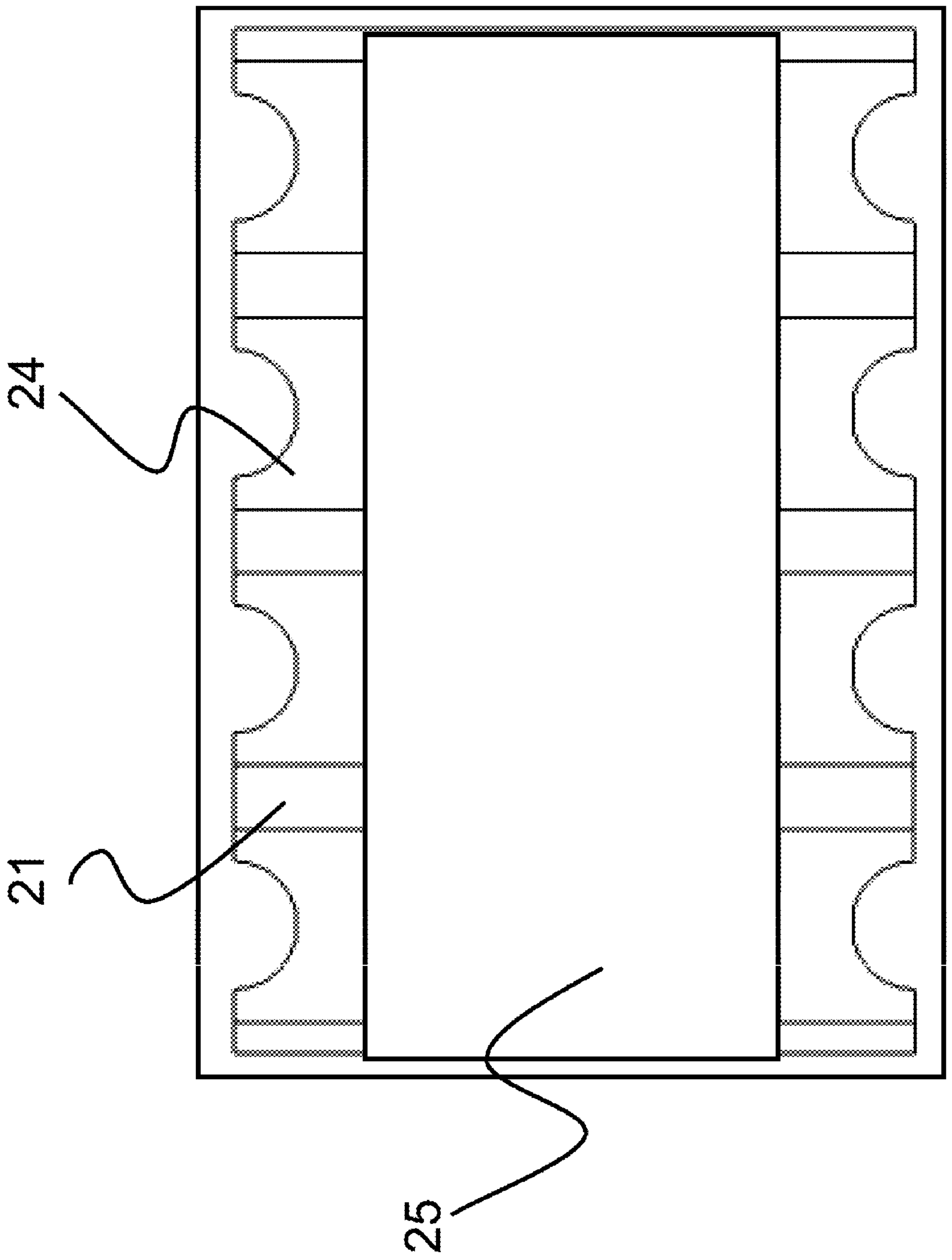
FIG. 11 is a schematic top view of the first embodiment of the invention, showing that the protection device is coated with a protective layer.
Figure 12:
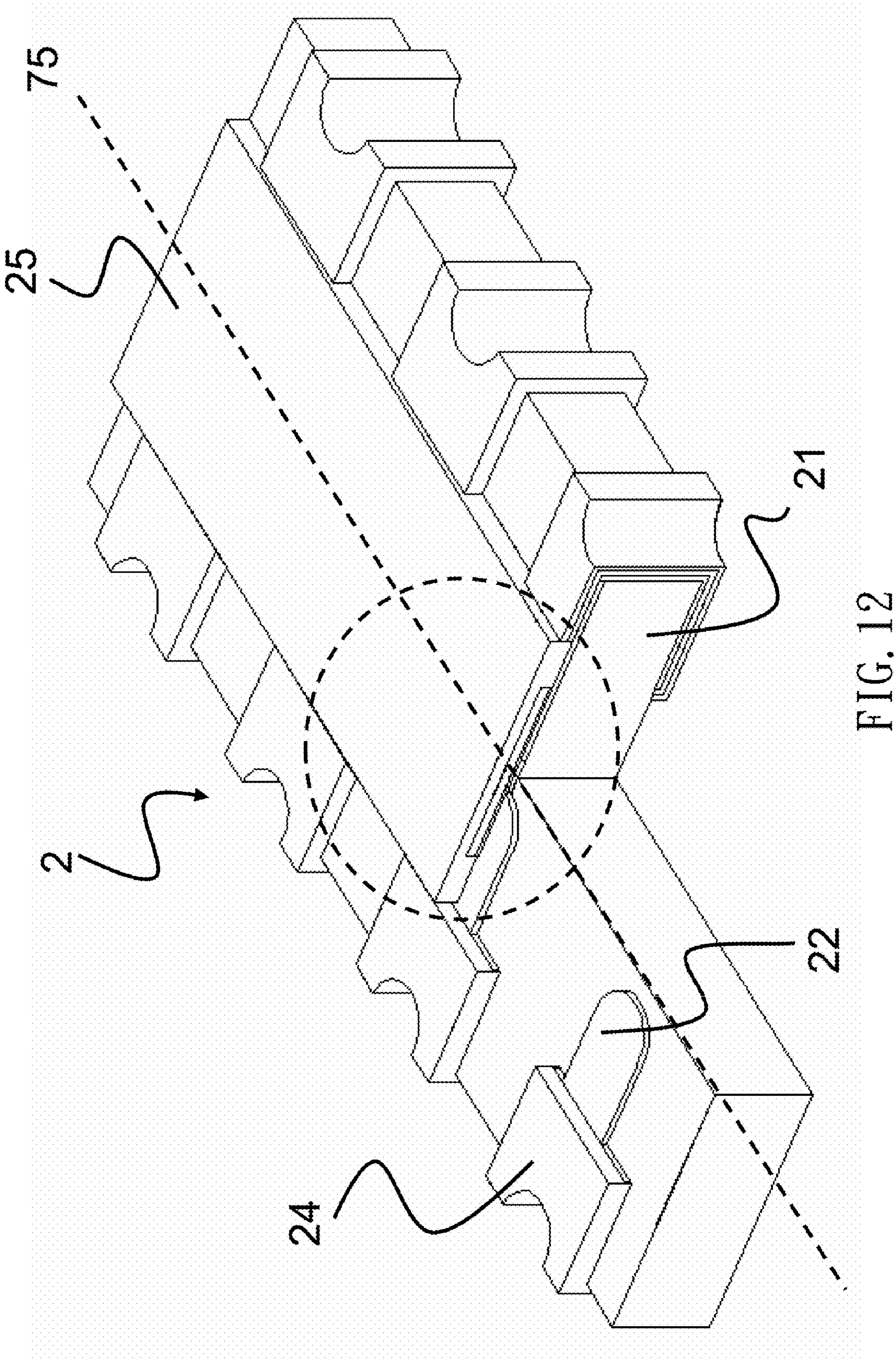
FIG. 12 is a partial cross-section perspective view showing a chip-type protection device having an enclosed micro-gap between electrodes according to the first embodiment of the invention.
Figure 13:
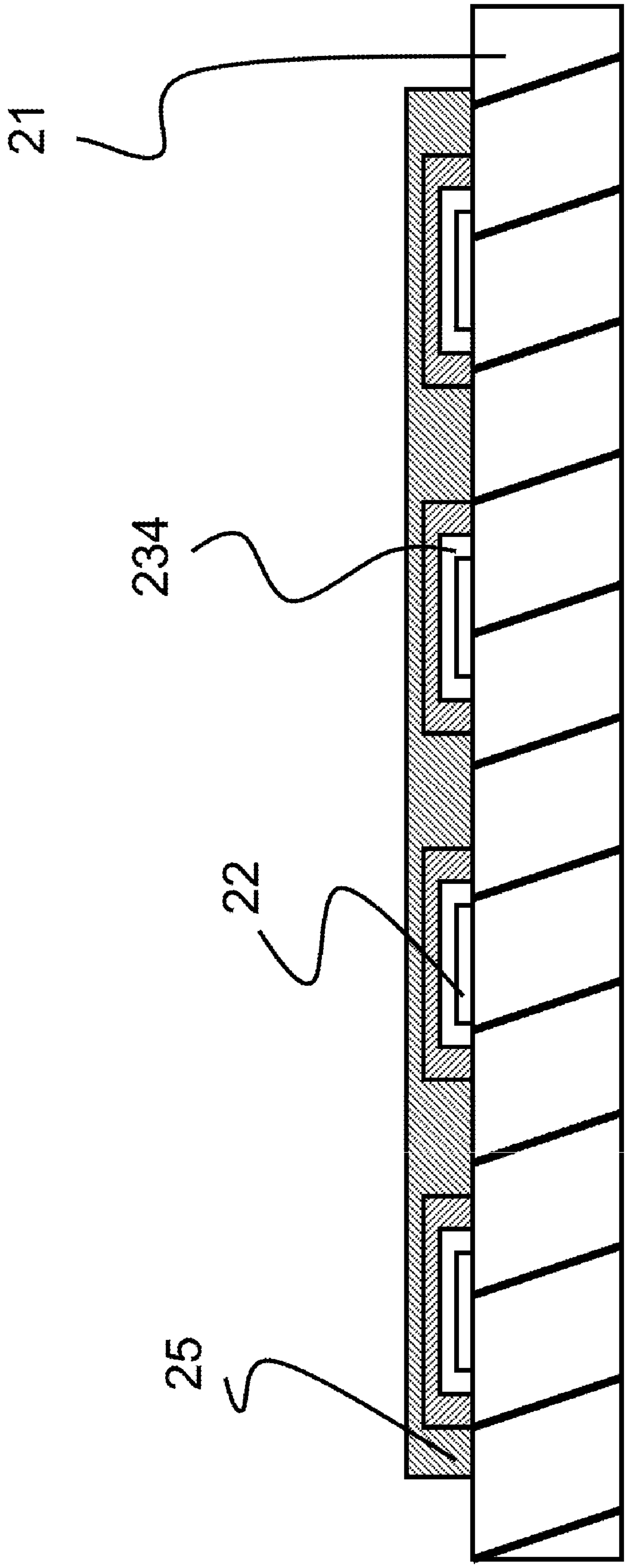
FIG. 13 is a schematic cross-section view showing a chip-type protection device having an enclosed micro-gap between electrodes according to the first embodiment of the invention.

Now referring to FIGS. 11-13, the chamber 234 formed according to the above mentioned procedure is coated with an outer protective layer 25 for additional protection. At edges of the substrate 21, the end electrodes 24 are first coated with a layer of Ni—Cr/Ni—Cu alloy or like material, on which a layer of Ni/Sn of like material is subsequently deposited to serve as an outermost solder interfacial layer.

Figure 14:
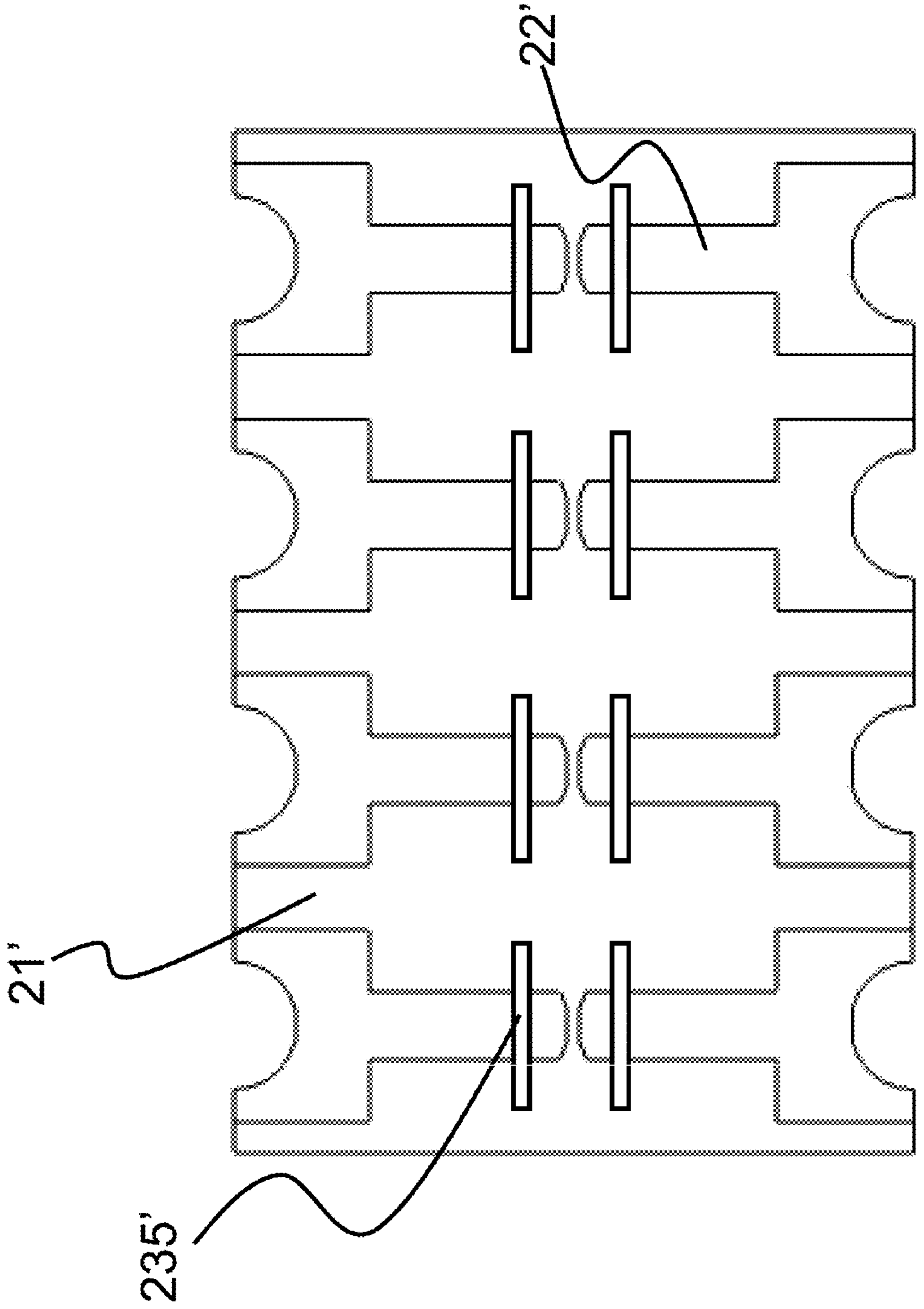
FIG. 14 is a schematic diagram showing the frame structure according to the second embodiment of the invention.

Of course, it would be appreciated by those skilled in the art that the elevated portion shown in the first embodiment above is provided for illustrative purpose only. According to the second embodiment shown in FIG. 14, respective frames 235' are deposited on the respective discharge portions of electrodes 22' mounted on a substrate 21' to constitute an elevated portion which is in turn subjected to a treatment to form a surrounding wall with a cover portion.

Figure 15:
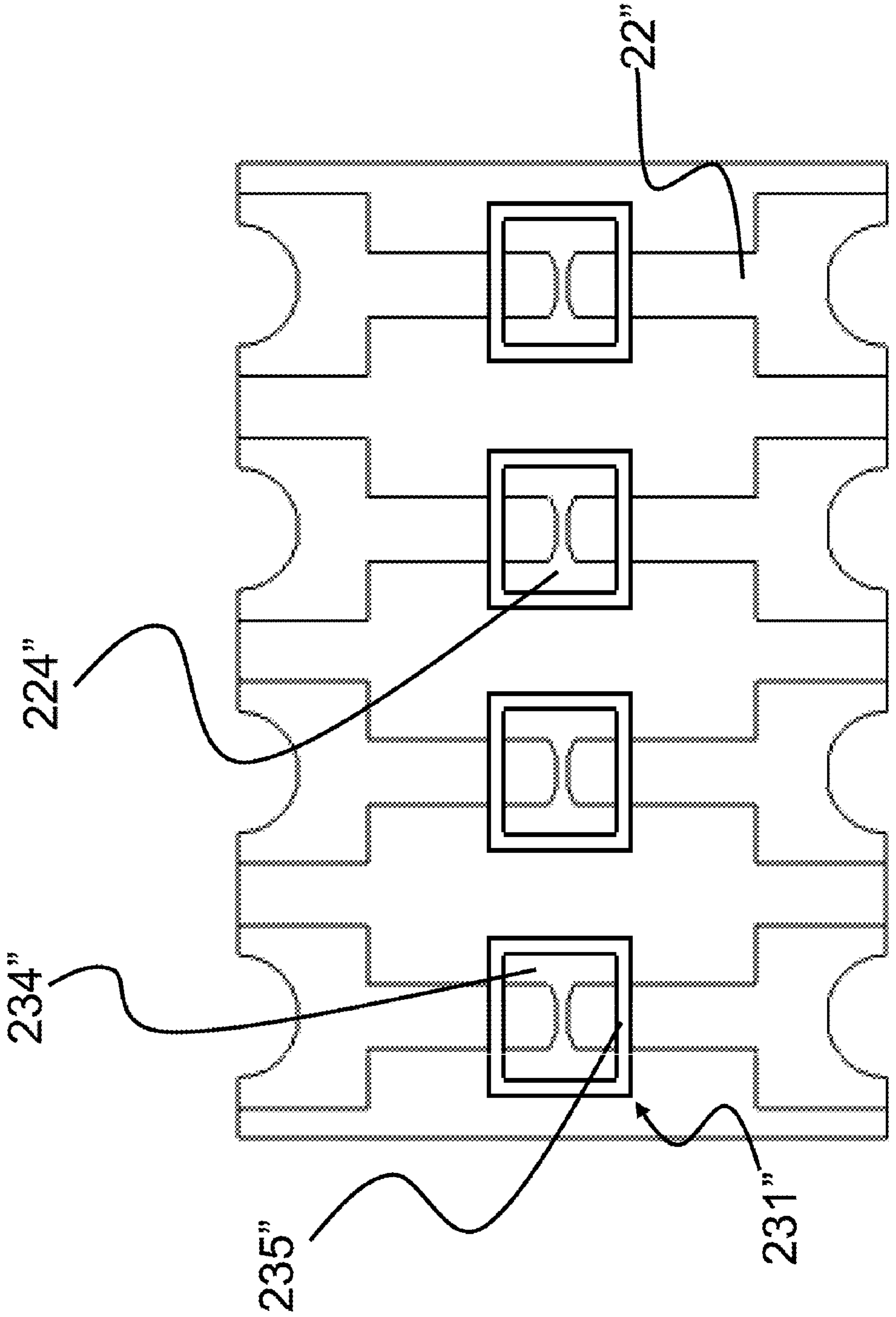
FIG. 15 is a schematic diagram showing the surrounding frames according to the third embodiment of the invention.

According to the third embodiment shown in FIG. 15, an elevated portion 231" includes a plurality of closed rectangular frames 235" disposed with the same number corresponding to the paired electrodes 22". In this embodiment, the respective frames 235" are adhesive photoresist layers surrounding respective micro-gaps 224" and a cover portion is pressed on and adhered to the frames 235". The resulting structure is then exposed to a radiation source having a predetermined wavelength (such as a UV radiation), so that the elevated portion 231" is integrated with the cover portion to form a chamber as described above. Preferably, the photoresist is of a polymeric material selected from epoxy resins, polyimide resins, acrylic resins, silicon resins and the like.

Figure 16:
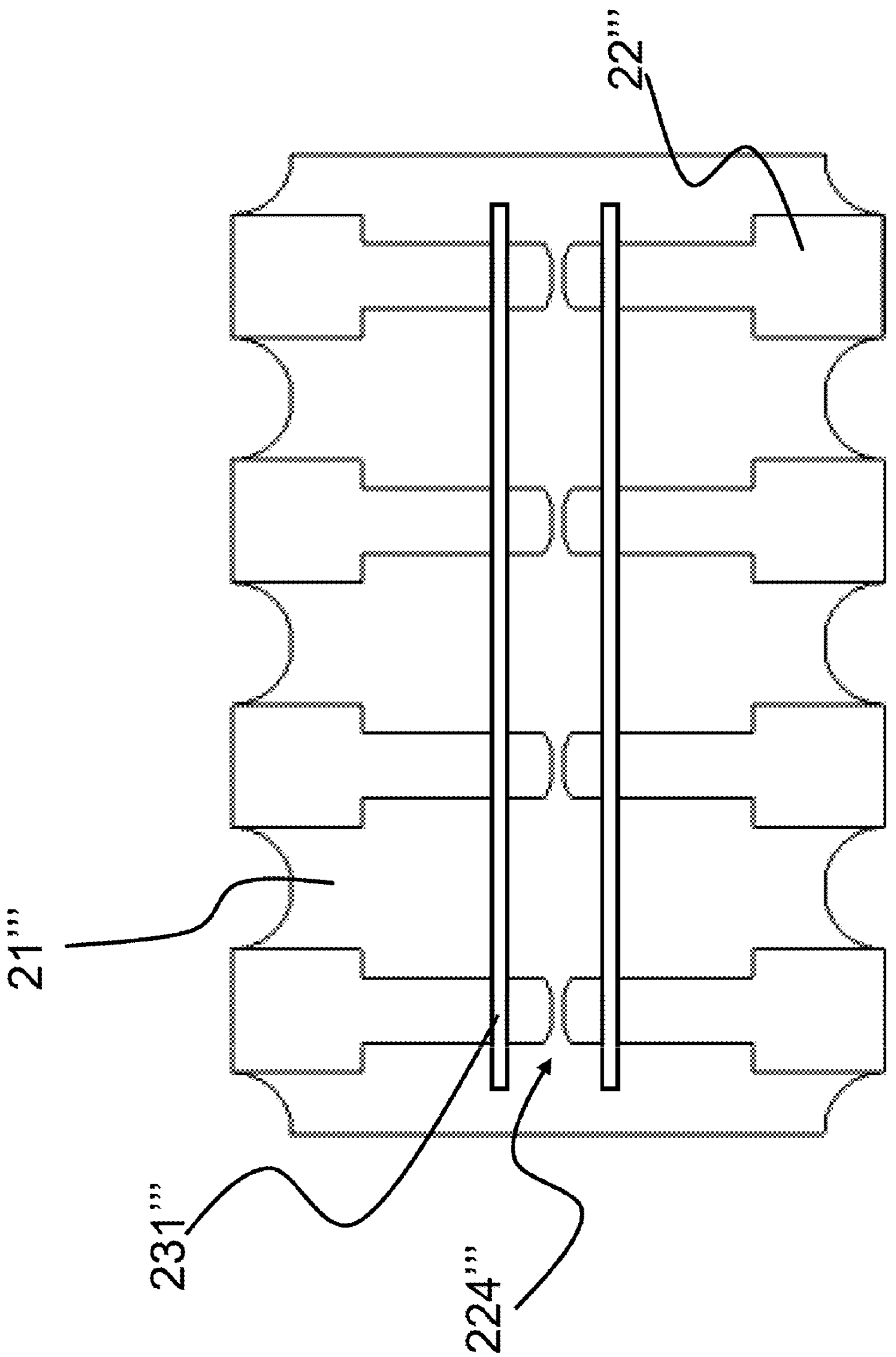
FIG. 16 is a schematic diagram showing the frames according to the fourth embodiment of the invention.

Furthermore, according to the fourth embodiment shown in FIG. 16, the discharge electrodes are not configured to recess inwardly from side walls but constructed as disclosed in R.O.C. Patent No. I281842 owned by the applicant, entitled "Manufacture Method for Multiple-Circuit Chip with Protruding Electrode," where the respective conductive portions of discharge electrodes 22'" are connected to respective protruding portions extending from the side walls of a substrate 21'". In the light of this configuration of electrodes, an elevated portion 231'" similarly constructed as described in the embodiments above, can still constitute a surrounding wall that encloses micro-gaps 224'" disposed between the paired discharge electrodes 22'", such that a protection device is fabricated with excellent performance.

The chip-type protection device having an enclosed micro-gap between electrodes according to the invention has advantages of being fabricated by a relatively simple process, and having a low manufacturing cost and an improved production yield. Meanwhile, the chamber incorporated with the micro-gap is formed in a specific gaseous environment, so as to generate a stable environment between paired discharge electrodes and prevent the gas within the chamber from being contaminated or reacting with the electrodes. By virtue of the configuration and characteristics, the chip-type protection device according to the invention provides reliable safety for the electronic devices to which it coupled.

While the invention has been described with reference to the preferred embodiments above, it should be recognized that the preferred embodiments are given for the purpose of illustration only and are not intended to limit the scope of the present invention and that various modifications and changes, which will be apparent to those skilled in the relevant art, may be made without departing from the spirit and scope of the invention.

What is claimed is:

1. A chip-type protection device having an enclosed micro-gap between electrodes, comprising:

a substrate having two opposite surfaces made of poor conductor;

plural sets of paired discharge electrodes, arranged in parallel to one another on either of the two opposite surfaces, wherein each set of the plural sets of paired discharge electrodes includes a pair of conductive portions connected to opposite edges of the substrate respectively and a pair of discharge portions extending from the respective conductive portions towards each other by a micro-gap; and a surrounding wall hermetically enclosing, together with the substrate, the micro-gaps to constitute a chamber having a predetermined gaseous environment, said surrounding wall comprising:

an elevated portion formed on the plural sets of paired discharge electrodes in a manner spaced apart from the micro-gaps by a predetermined distance; and at least one cover portion disposed above the elevated portion in a straddling manner across the micro-gaps;

wherein the elevated portion is a plurality of frames, each being formed on one of the discharge electrodes.

2. A chip-type protection device having an enclosed micro-gap between electrodes, comprising:

a substrate having two opposite surfaces made of poor conductor;

plural sets of paired discharge electrodes, arranged in parallel to one another on either of the two opposite surfaces, wherein each set of the plural sets of paired discharge electrodes includes a pair of conductive portions connected to opposite edges of the substrate respectively and a pair of discharge portions extending from the respective conductive portions towards each other by a micro-gap; and a surrounding wall hermetically enclosing, together with the substrate, the micro-gaps to constitute a chamber having a predetermined gaseous environment, said surrounding wall comprising:

an elevated portion formed on the plural sets of paired discharge electrodes in a manner spaced apart from the micro-gaps by a predetermined distance; and at least one cover portion disposed above the elevated portion in a straddling manner across the micro-gaps;

wherein the elevated portion is a plurality of surrounding frames, each surrounding one of the micro-gaps in a straddling manner across one corresponding set of the plural sets of paired discharge electrodes.

3. The protection device according to claim 1, wherein the elevated portion and the cover portion are both made of a dry film photoresist composition that can be melted and integrated by heating.

4. The protection device according to claim 3, further comprising an outer protective layer coated on the surrounding wall.

5. The protection device according to claim 1, wherein the elevated portion and the cover portion are both made of photocurable adhesive material.

6. The protection device according to claim 5, further comprising an outer protective layer coated on the surrounding wall.

7. The protection device according to claim 2, wherein the elevated portion and the cover portion are both made of a dry film photoresist composition that can be melted and integrated by heating.

8. The protection device according to claim 7, further comprising an outer protective layer coated on the surrounding wall.

9. The protection device according to claim 2, wherein the elevated portion and the cover portion are both made of photocurable adhesive material.

10. The protection device according to claim 9, further comprising an outer protective layer coated on the surrounding wall.

* * * * *